(12) United States Patent
Yahil et al.

(10) Patent No.: US 7,328,182 B1
(45) Date of Patent: Feb. 5, 2008

(54) SYSTEM AND METHOD FOR PREDICTION OF BEHAVIOR IN FINANCIAL SYSTEMS

(75) Inventors: Amos Yahil, Stony Brook, NY (US); Richard Puetter, San Diego, CA (US)

(73) Assignee: Pixon, LLC, Stony Brook, NY (US)

( * ) Notice: Subject to any disclaimer, the term of this patent is extended or adjusted under 35 U.S.C. 154(b) by 0 days.

(21) Appl. No.: 09/404,122

(22) Filed: Sep. 23, 1999

(51) Int. Cl.
*G06Q 40/00* (2006.01)
(52) U.S. Cl. ..................... 705/36 R; 705/35
(58) Field of Classification Search .............. 703/2; 705/35–37
See application file for complete search history.

(56) References Cited

U.S. PATENT DOCUMENTS

| | | | |
|---|---|---|---|
| 5,444,819 A | 8/1995 | Negishi | |
| 5,544,281 A | 8/1996 | Maruoka et al. | |
| 5,758,031 A | 5/1998 | De silva | |
| 5,761,442 A | 6/1998 | Barr et al. | |
| 5,842,199 A | 11/1998 | Miller et al. | |
| 5,912,993 A | 6/1999 | Puetter et al. | |
| 6,353,688 B1* | 3/2002 | Puetter et al. | 382/205 |
| 6,490,374 B2 | 12/2002 | Puetter et al. | |

OTHER PUBLICATIONS

Puetter, R.C. "Pixon-Based Multiresolution Image Reconstruction and the Quantification of Picture Information Content", Int'l. Journal of Image Systems & Technologies pp. 314-331, Winter 1995. (Item #2 on Pixon web site bibliography, Jun. 21, 2001).*

Puetter, R.C. "The Pixon Method of Image Reconstuction", Proc. ADASS '98 (Nov. 1-4, 1998). In Astronomical Data Analysis Software and Systems VIII, vol. 172, pp. 307-316. (Item #17 on Pixon web site bibliography, Jun. 21, 2001).*

Puetter, R.C. "Language and Information Content". Proc. Of 1995 IAC Winter School, Dec. 3-12, 1995, Tenerife, Spain. (Item #6 on Pixon web site bibliography, Jun. 21, 2001.).*

Puetter, R.C. "Information, Language, and Pixon-Based Image Reconstruction". Non-Linear Signal and Image Analysis, Proc. 11th Florida Workshop on Non-Linear Astronomy and Physics, Nov. 30-Dec. 2, 1995. (Item #10 on Pixon web site biblio., Jun. 21, 2001).*

(Continued)

*Primary Examiner*—Hani M. Kazimi
(74) *Attorney, Agent, or Firm*—Eleanor M. Musick; Procopio, Cory, Hargreaves & Savitch LLP (57) ABSTRACT

A computer-based system and method are provided to determine the minimum number of factors required to account for input data by seeking an approximate minimum complexity model. In an exemplary embodiment, covariance in the daily returns of financial securities is estimated by generating a positive-definite estimate of the elements of a covariance matrix consistent with the input data. Complexity of the covariance matrix is minimized by assuming that the number of independent parameters is likely to be much smaller than the number of elements in the covariance matrix. Each variable is described as a linear combination of independent factors and a part that fluctuates independently. The simplest model for the covariance matrix is selected so that it fits the data to within a specified level as determined by the selected goodness-of-fit criterion.

13 Claims, 3 Drawing Sheets

OTHER PUBLICATIONS

Puetter, R.C. "Information, Language, and Pixon-Based Image Reconstruction". Proceedings of SPIE, vol. 2827, Aug. 1996. (Item #12 on Pixon web site bibliography, Jun. 21, 2001).*

Mathworks, Inc. "MATLAB Functional Reference: 'sum' function" Copyright 1994-2001. Also, Sepherke, Matlab "Matrix and Element-wise Operations", Mar. 21, 1998. http://www.mit.edu/afs/sipb/project/www/matlab/imatlab/node10.html.*

Mathworks, Inc. "The MATLAB Computing Environment for Finance and Economics" Copyright 1997. http://www.ccr.jussieu.fr/ccr/Documentation/Calcul/matlab5v11/docs/.*

Verndinelli, Isabella et al. "Bayesian Goodness of Fit Testing Using Infinite Dimensional Exponential Families", Carnegie Mellon Dept. of Statistics Technical Reports, Report #640, Jan. 1996. http://www.stat.cmu.deu/tr/tr640/tr640.html.*

Murphy, Kevin. "A Brief Introduction to Graphical Models and Bayesian Networks". http://http.cs.berkeley.edu/~murphyk/Bayes/bayes.html. Last updated Oct. 3, 2001.*

Schlögl, Alois. "Index for /home/schloegl/matlab/tsa", "Content" and "Selmo" from "Alois' Matlab and Math's Site", Time Series Analysis pages. Aug. 17, 1997. http://www-dpmi.tu-graz.ac.at/~schloegl/matlab/tsa/1.tsa/index.html.*

Mathworks, Inc. "GARCH Toolbox: For Use with Matlab" pp. 2-5, 2-6. Copyright 1999-2000. Provides formula for AIC and BIC. Cites as reference Box et al., from 1994.*

SAS, Inc. "The VARMAX Procedure: Overview". Copyright 2000. Specifically states that "Schwartz Bayesian Criterion (SBC) is also known as Bayesian Information Criterion (BIC)". http://www.sas.com/rnd/app/da/new/801ce/ets/chap4/sect1.htm.*

USGS Northern Prairie Wildlife Research Center, "Suggestions for Presenting the Results of Data Analyses: Information-Theoretic Methods", 2001. Specifically refers to Bayesian Information Criterion (BIC) and cites Schwartz 1978.*

Forster, M.R. "The New Science of Simplicity". (1999). Refers to "Bayesian BIC citerion" and specifically cites Schwarz 1978.*

Pixon™ homepage and bibliography, Jun. 21, 2001.*

Rick Puetter's Home Page, (Last Updated Feb. 21, 2000). http://casswww.ucsd.edu/personal/puetter.html.*

Schwartz, Gideon. "Estimating the Dimension of a Model", The Annals of Statistics, vol. 6, No. 2, Mar. 1978. pp. 461-464.*

The MathWorks, Inc. "GARCH Toolbox: For Use With MATLAB", Jul. 1999.*

Alexander, D. et al., "A Spectral Analysis of the Masuda Flare Using Yohkoh Hard X-Ray Telescope Pixon Reconstruction," *The Astrophysical Journal*, Nov. 1, 1997, pp. 442-455, vol. 489, The American Astronomical Society, U.S.A.

Dixon, D. D., et al., "Pixon-based deconvolution," *Astron. Astrophys. Suppl. Ser.* 120, Dec. 1996, pp. 683-686, European Southern Observatory, Provided by the NASA Astrophysics Data System, U.S.A.

Dixon, D.D. et al., "Skymapping with Osse Via the Mean Field Annealing Pixon Technique," *The Astrophysical Journal*, Aug. 1, 1997, pp. 891-899, vol. 484, The American Astronomical Society, U.S.A.

Marsden, D. et al., "Rosat Observations of the Soft Gamma-Ray Burst Error Box Coincident with the Supernova Remnant N49," *The Astrophysical Journal*, Oct. 10, 1996, pp. 513-520, vol. 470, The American Astronomical Society, U.S.A.

Metcalf, T. R. et al., "Pixon-Based Multiresolution Image Reconstruction for Yohkoh's Hard X-Ray Telescope," *The Astrophysical Journal*, Jul. 20, 1996, pp. 585-594, vol. 466, The American Astronomical Society, U.S.A.

Metcalf, T. R. et al, "Pixon-Based Multiresolution Image Reconstruction for Yohkoh's Hard X-Ray Telescope," *Maximum Entropy and Bayesian Methods*, 1996, pp. 361-365, Kluwer Academic Publishers, The Netherlands.

Puetter, R. C., "Information, Language, and Pixon-Based Image Reconstruction," *Nonlinear Signal and Image Analysis*, Jan. 30, 1997, vol. 808, The New York Academy of Sciences, U.S.A.

Puetter, R. C., "The Image Restoration/Reconstruction Problem," in "Instrumentation for Large Telescopes," Eds. Rodriguez Espinosa, Herrero & Sanchez, Cambridge Contemporary Astrophysics, 1997, U.S.A.

Puetter, R. C. et al., "Pixon-Based Image Reconstruction," *Maximum Entropy and Bayesian Methods*, 1996, pp. 275-292, Kluwar Academic-Publishers, The Netherlands.

U.S. Appl. No. 10/041,253, Yahil et al, not published.

* cited by examiner

SYSTEM AND METHOD FOR PREDICTION OF BEHAVIOR IN FINANCIAL SYSTEMS

RELATED APPLICATIONS

This application is related to co-pending application Ser. No. 09/905,528, filed Aug. 22, 2001, which is a continuation of Ser. No. 09/333,172, filed Jun. 14, 1999, now issued as U.S. Pat. No. 6,353,688, which is a continuation-in-part of application Ser. No. 08/073,929, filed Jun. 8, 1993, now issued as U.S. Pat. No. 5,912,993. The subject matter of these applications is incorporated herein by reference.

COMPUTER APPENDIX

A Computer Appendix containing computer program source code for programs described herein has been submitted concurrently with the filing of this application. The Computer Appendix will be converted to a Microfiche Appendix pursuant to 37 C.F.R. 1.96(b). The Computer Appendix, which is referred to as "Microfiche Appendix A", is incorporated herein by reference in its entirety. The Computer Appendix contains material that is subject to copyright protection. The copyright owner has no objection to the facsimile reproduction by anyone of the patent document or patent disclosure; as it appears in the Patent and Trademark Office patent file or records, but otherwise reserves all copyright rights.

FIELD OF THE INVENTION

The present invention relates generally to a computer-based system and method for organization and prediction of behavior in complex systems. More particularly, the present invention relates to a system and method for minimizing the number of parameters required to model the complex system.

BACKGROUND OF THE INVENTION

Numerous algebraic modeling methods have been proposed in efforts to organize the properties of complex systems in order to control and/or predict their behavior. Examples of applications of modeling techniques to complex systems include economic modeling of securities, inventories, cash flow, sales, and marketing, manufacturing and systems control, and scientific applications to spectral analysis. In many such systems, while the real number of underlying variables that describe the system properties may be small, these variables are unknown. Because of the complexity of the data and the presence of sampling errors, the model can end up with too many parameters, the quantity of which can equal, or even exceed, the number of data points. This is a common problem in nonparametric analysis, where using too many parameters leads to large statistical uncertainty and biases in the derived model parameters, and in the correlations among them.

In the area of financial prediction, numerous methods have been proposed that are based upon covariance matrix models. For example, in U.S. Pat. No. 5,444,819, of Negishi, an economic phenomenon predicting and analyzing system using a neural network is described. Learning data is input into the network, including past trends, patterns of variations, and the objective economic phenomenon corresponding to the past data. The hidden layer acts as a number of covariance matrices, categorizing the data in an attempt to identify a small number of principal variants or components, ideally reducing the number of variants to be considered in the prediction of moving averages.

This neural network of Negishi is an attempt at applying the principle of "minimum complexity", also called "algorithmic information content." This principle is a manifestation of Ockham's razor—to minimize the number of parameter required to fit the system. Minimum complexity enables an efficient representation of the complex system and is the best way to separate a signal from noise. (For purposes of this application "signal" means the desired information, which can be financial data or other information to be extracted from an input containing an excess of information, much of which can be considered superfluous background noise.) If the signal can be adequately represented by a minimum of P parameters, addition of another parameter only serves to introduce artifacts by fitting the noise. Conversely, the removal of too many parameters can result in an improper representation of the system, since adequate fitting of a model to the system requires a minimum of P parameters.

While minimum complexity has a clear theoretical advantage, it can be computationally intensive, making it difficult to reach a conclusion in a period of time that would permit practical application, unless the parameterization of the system in known in advance. A representation of a system requires a model language that decomposes it into smaller units, and one must choose between a vast number of languages, i.e., means for expressing the algorithm. Even after a language is chosen, the set of all possible parameterizations with that language can become too large to search practically. For example, consider modeling the covariance matrix of a system of N variables with P parameters, such as discussed above relative to the Negishi patent. Standard estimates assume that all the elements of the covariance matrix are significant, i.e., each variable is correlated with every other variable. This gives $N(N+1)/2$ independent elements of the covariance matrix (after accounting for the symmetry of the covariance matrix). A minimum complexity model seeks to represent these $N(N+1)/2$ numbers by a much smaller number P of parameters. One simple approach would be to set to zero all but P of the $N(N+1)/2$ elements. However, the choice of P elements among $N(N+1)/2$ is a combinatorially large problem and an exhaustive evaluation of all of the possibilities is not practical. In addition, the covariance matrix must be positive definite, and this constraint further restricts the possible parameterizations. It is clear therefore, that a practical method is needed which will find a minimum-complexity model without requiring an exhaustive search of all possible parameterizations.

Others in the field have proposed prediction and risk assessment techniques based using covariance matrices, with some developing relatively complex models with a large number of variables, thus producing a computationally-intensive model. See, e.g., Tang, "The Intertemporal Stability of the Covariance and Correlation Matrices of Hong Kong Stock Returns", *Applied Financial Economics,* 8:4:359-65; Nawrocki, "Portfolio Analysis with a Large Universe of Assets", *Applied Economics,* 28:9:1191-98. Others have proposed models in which the number of parameters is so small that one must be concerned about the accuracy of the representation of the system. See, e.g., Hilliard and Jordan, "Measuring Risk in Fixed Payment Securities: An Empirical Test of the Structured Full Rank Covariance Matrix", *Journal of Financial and Quantitative Analysis, September* 1991.

In related application Ser. No. 333,172, the inventors disclose a signal and image reconstruction method which utilizes the minimum complexity principle, in which the method adapts itself to the distribution of information content in the image or signal. Since a minimum complexity model more critically fits the image to the data, the parameters of the image are more accurately determined since a larger fraction of the data is used to determine each one. For the same reason, a minimum complexity model does not show signal-correlated residuals, and hence provides unbiased source strength measurements to a precision limited only by the theoretical limits set by the noise statistics of the data. In addition, since the image is constructed from a minimum complexity model, spurious (i.e., artificial or numerically created) sources are eliminated. This is because a minimum complexity model only has sufficient parameters to describe the structures that are required by the data and has none left over with which to create false sources. These fundamental parameters are known as Pixon™ elements, which are also described in related U.S. Pat. No. 5,912,993. Finally, because the method builds a critical model and eliminates background noise, it can achieve greater spatial resolution than competing methods and detect fainter signal sources that would otherwise be hidden by background noise.

It would be desirable to apply the methods of minimum complexity to a method for prediction of behavior of complex systems where the behavior can be modeled algebraically, and where the computation time is appropriate for practical applications.

SUMMARY OF THE INVENTION

It is an advantage of the present invention to provide a method for minimizing the complexity of algebraic models for modeling the behavior of complex systems.

It is another advantage of the present invention to provide a method for minimizing the complexity of algebraic models used for modeling complex systems in a practical amount of time using a conventional computer.

Yet another advantage of the invention is to provide an accurate measurement and prediction of the properties of complex systems.

Still another advantage of the present invention is to provide a method for minimizing the number of factors that are required for modeling of behavior in a complex system.

It is another advantage of the present invention to provide a method for minimizing the number of factors needed to characterize a complex system in a practical amount of time using a conventional computer.

It is yet another advantage of the present invention to provide a method for assessment of risk and volatility in securities and other financial investments.

A system and method are provided for building efficient algebraic models of complex systems by seeking the algebraic model with the minimum complexity, i.e., number of parameters, that adequately describes the properties of the system. The invention identifies an Algebron™ element, which is a fundamental and indivisible unit of information contained in the data. The actual Algebron™ elements that are selected during an iterative process represent the smallest number of such units required to fit the data.

The Algebron™ system and method utilize a software program stored in a personal computer (PC) to determine the minimum number of factors required to account for the input data by seeking an approximate minimum complexity model that is achievable in a limited period of time using a reasonable number of computational steps. In an exemplary embodiment for estimating covariance in the daily returns of financial securities, the method generates a positive-definite estimate of the elements of a covariance matrix consistent with the input data. However, the method minimizes complexity of the covariance matrix by assuming that the number of independent parameters is likely to be much smaller that the number of elements in the covariance matrix. The Algebron™ method minimizes the number of independent parameters by describing each variable as a linear combination of independent factors and a part that fluctuates independently. The simplest model for the covariance matrix is selected so that it fits the data to within a specified quality as determined by the selected goodness-of-fit (GOF) criterion. In this case, the GOF criterion is the logarithm of the likelihood function.

The Algebron™ element is a fundamental and indivisible unit of information, i.e., the theoretical limit of the information content of the data. The ultimate characterization of the covariance matrix of the object of interest is obtained by extracting all of its Algebron™ elements. While based on a principle much like the Pixon™ method first disclosed in U.S. Pat. No. 5,912,993, the distinction between Algebron™ elements and Pixon™ elements is that Pixon™ elements are spatially based within an image or signal, and their location plays a role in the description of the model. Algebron™ elements, on the other hand, are single algebraic elements in the model developed for the data that have no spatial position.

BRIEF DESCRIPTION OF THE DRAWINGS

The present invention will be better understood from the following detailed description of some preferred embodiments of the invention, taken in conjunction with the accompanying drawings, in which:

FIGS. 1a and 1b show fits to measured data, where

DETAILED DESCRIPTION OF THE PREFERRED EMBODIMENTS

A computer, such as a fast desktop personal computer ("PC"), is used to generate an efficient, minimum complexity algebraic model for the complex system of interest. In the illustrative example described, the Algebron™ method is used to estimate the covariance of non-uniformly sampled financial return data. The example provided herein describes application of the Algebron™ method to securities for purposes of risk management and forecasting. However, the method is not restricted to securities applications, and may be used for a wide range of evaluations of complex systems which typically include large numbers of variables, including a number of business-related applications such as economic predictions, sales, marketing, inventories, scientific applications, such as spectral analysis, and industrial applications, such as control systems.

Use of the Algebron™ method for efficient algebraic modeling of complex systems is provided by the two examples given below. In the first example noisy data known to be of polynomial form are analyzed by both conventional fitting methods and by the Algebron™ method. In the second example, the Algebron™ method is used to model the covariance matrix of daily returns of a family of bonds and compared to standard techniques for covariance matrix estimation.

Example 1

This example illustrates the use of the Algebron™ method to model noisy data that are known to contain an underlying twelfth order polynomial signal. FIGS. 2a and 2b show fits to the measured data. In the specific example chosen here, the true signal is the polynomial $y(x)=30x_4-20x_7-5x_8$, and the noise is normally distributed (Gaussian) with a standard deviation of 0.25. FIG. 2a shows the result of a $\chi_2$-fit of a twelfth order polynomial to the data using standard methods. From visual inspection, the quality of the fit seems quite good. However, the values determined for the coefficients of $x_4$, $x_7$, and $x_8$, of $-27836.394$, $728246.77$, and $-890971.70$ respectively, are very far from the correct value of 30, $-20$, and $-5$. In fact, equally large magnitude values for the coefficients of the other absent polynomial powers are also determined. These large and disturbing errors are due to fitting the data with too complex a model. These problems can only be alleviated by imposing a minimum complexity constraint on the model such as is done in the Algebron™ method.

The Algebron™ fit is shown in FIG. 2b. Visual inspection of this fit also confirms that it is excellent. In contrast to the standard $\chi_2$-fit, however, the Algebron™ fit achieves very good accuracy. The values determined for the coefficients of $x_4$, $x_7$, and $x_8$ are 29.8, $-20.4$, $-4.38$, very close to the true values of 30, $-20$, and $-5$. In addition, the Algebron™ fit finds no powers of x that are not present in the signal.

Example 2

In the second example, the Algebron™ method is used to estimate volatility (covariance matrix) of a family of 132 securities reported over a period of 820 days. With complete data, the covariances of the securities are directly calculable from the returns $X_\alpha$ and $X_\beta$ of the individual securities $\alpha$ and $\beta$. To reduce the number of independent elements of the covariance matrix, an analysis procedure is used in which each variable $X_\alpha$ is described as a linear combination of unknown factors $f_\beta$, and a part that fluctuates independently, $N_\alpha$, which corresponds to the remaining "noise" associated with the securities:

$$X_\alpha = \sum_{\beta=1}^{k} \Lambda_{\alpha,\beta} f_\beta + N_\alpha, \qquad (1)$$

The k factors, $f_\beta$, are independent of each other, and independent of the noise terms $N_\alpha$. The goal of the factor analysis is to determine the minimum set of factors necessary to describe the observations. When this is accomplished, the covariance matrix $V_{\alpha,\beta}$ is completely described in terms of the loading matrix $\Lambda_{\alpha,\beta}$, and additional, independent dispersions $\sigma_\alpha$:

$$V_{\alpha,\beta} = \sum_k \Lambda_{\alpha k} \Lambda_{\beta k} + \sigma_\alpha^2, \qquad (2)$$

where $\sigma_\alpha^2$ is the variance of $N_\alpha$. Thus, the complexity of the model is minimized by minimizing the number of factors needed to account for the data as well as minimizing the number of nonzero loading matrix coefficients $\Lambda_{\alpha k}$.

The data set chosen for this example presents tremendous problems for standard analysis techniques. For example, in the time series of the returns, two-thirds of all of the possible data are missing because of gaps in the trading or the reporting of the returns. Hence, direct calculation of the covariance matrix is impossible. Some form for sophisticated algebraic modeling is essential in order to estimate the covariance. In this example, the Algebron™ model of the covariance matrix required 8 factors and a total of 152 off-diagonal, nonzero loading matrix coefficients. This compares to standard factor analysis methods that would use 924 off-diagonal, nonzero loading matrix elements for this number of factors. As with Example 1, the presence of the large number of unnecessary model parameters grossly affects the determination of the remaining required parameters. Hence, the ten-fold reduction in model complexity afforded by the Algebron™ method leads to a tremendous improvement in accuracy.

Figure 1A:
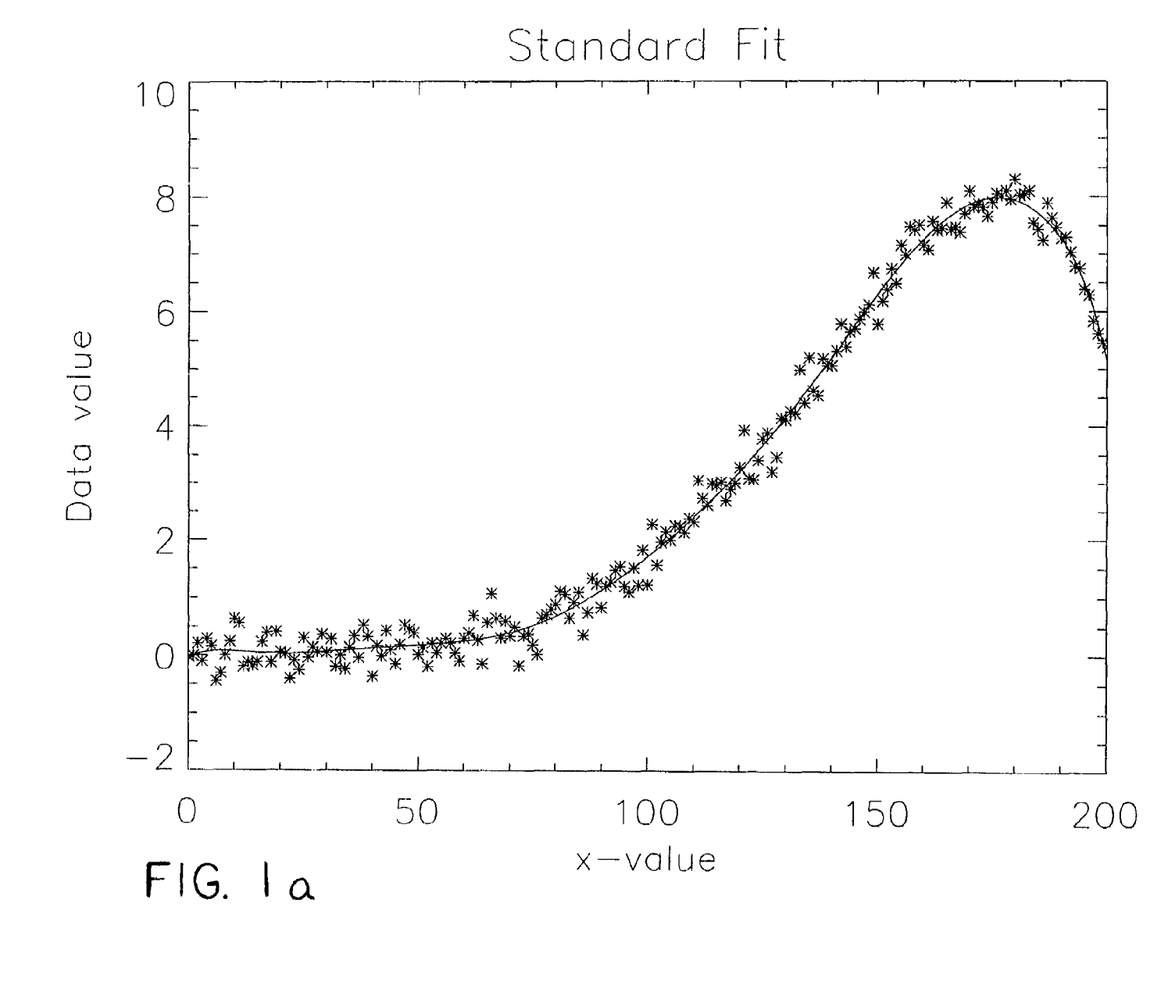
FIG. 1a is a plot of a $\chi^2$-fit to a twelfth order polynomial signal using prior art methods.
Figure 1B:
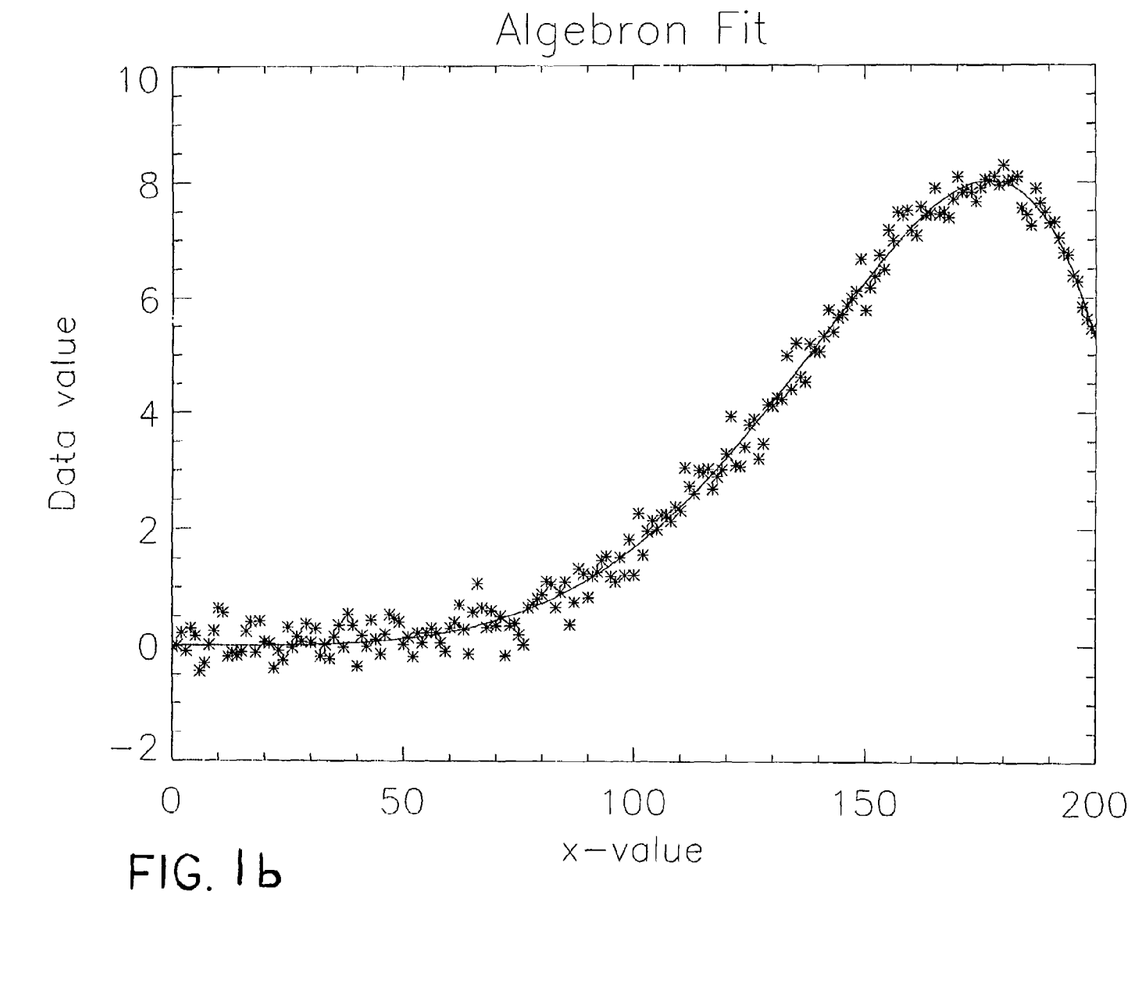
FIG. 1b is a plot of an Algebron™ fit according to the present invention.
Figure 2:
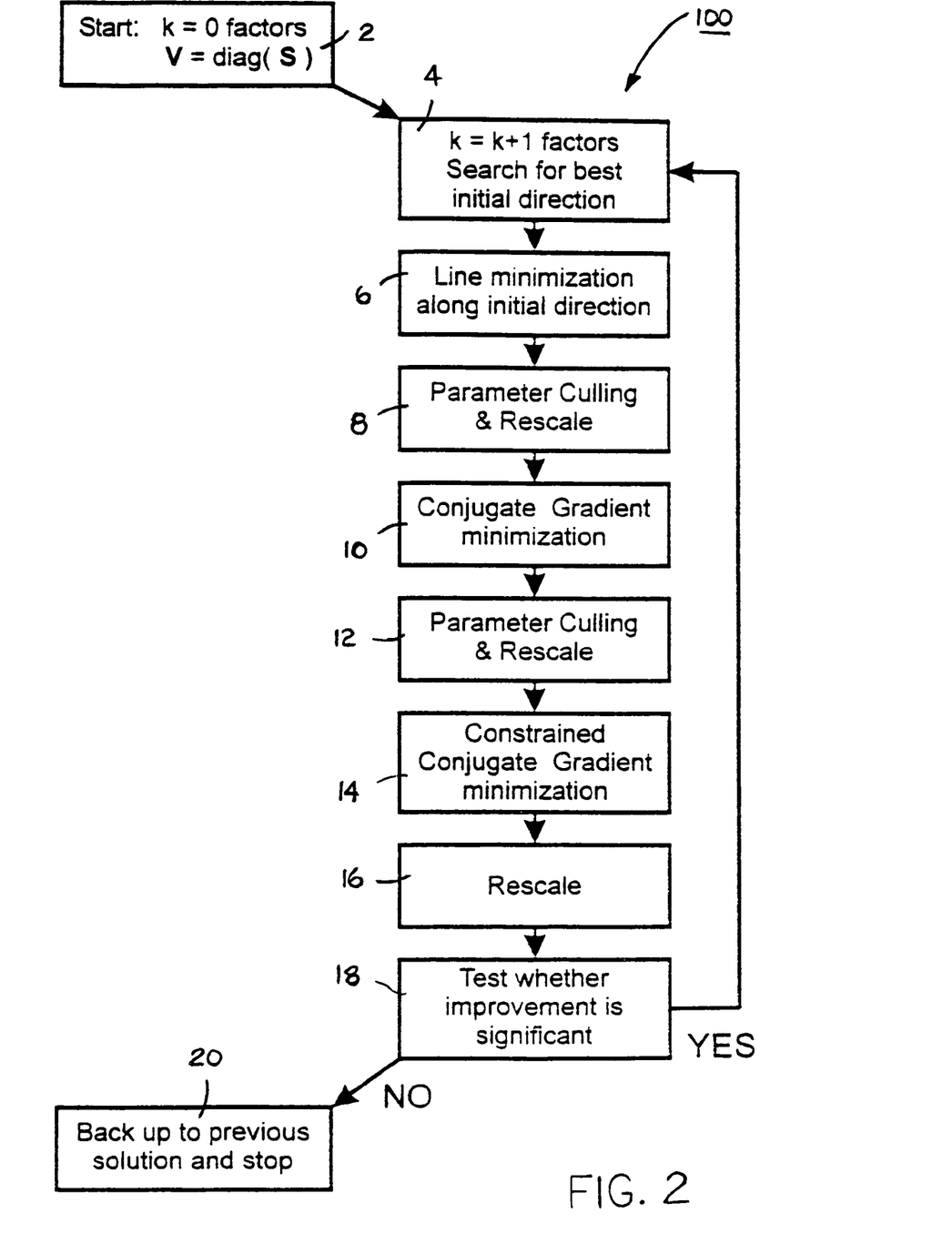
FIG. 2 is a flow chart of the covariance estimator according to the present invention.

FIG. 2 provides a top level flowchart 100 for covariance estimation using the Algebron™ method, with corresponding references to several subroutines of the computer program provided in accompanying Computer Appendix A. In step 2, the input data has been provided and the initial starting condition assumes that there are zero factors k in the loading matrix $\Lambda$, i.e., there is no loading matrix, and the covariance matrix V consists of diagonal S. At this point, the sigmas, $\sigma$, are set to the sampling standard. The main routine for performing the Algebron™ method is provided in the [algebron.f90] subroutine contained in Computer Appendix A. Loop 4-18 begins by the addition of one factor, which in the first iteration means that there is now one factor. In step 6, a line search is performed along the initial direction, which is the $\Lambda$ direction with the largest negative curvature, i.e., the strongest descent direction in the multivariate saddle point. This step calls up the [linmin.f90] subroutine, which compares the values to the minimization limits. The goal is to minimize the log-likelihood function L (in the [ml.f90] subroutine) and the covariance matrix V as follows:

$$L = -2\ln\Pr(D \mid M) = \sum_n w_n (\ln\|V_n\| + x_n o V_n^{-1} o x_n), \qquad (3)$$

where n sums over the samples, and $\Pr(D|M)$ is a goodness-of-fit quantity measuring the probability of the data D given the model M. The covariance matrix is described in terms of the loading matrix $\Lambda$:

$$V_{ij} = \sigma_i \sigma_j \left( \delta_{ij} + \sum_\alpha \Lambda_{i\alpha} \Lambda_{j\alpha} \right), \qquad (4)$$

where $\alpha$ sums over the k factors being considered, and $\delta_{ij}$ is the Kronecker delta. In step 8, parameters are culled by truncating all elements below a predetermined value (subroutine [cull.f90]) according to Equation 5:

$$\Lambda_{i\alpha} \to 0 \text{ for } \Lambda_{i\alpha}^2 \frac{\left(\sum_n w_n\right)^2}{\sum_n w_n^2} < n_\sigma^2, \qquad (5)$$

where the sum is only over points for which a sample of variable i exists. The covariance matrix is re-scaled for the correct chi$^2$ before and after the minimization according to the relationship:

$$V \to \alpha V; \alpha = \frac{\sum_n w_n x_n \cdot V_n \cdot x_n}{\sum_n w_n m_n}. \quad (6)$$

If there is no direction to meet the criteria, the program exits the loop.

In step 10, the log-likelihood function, the selected goodness-of-fit criterion for this example, is minimized by using the conjugate gradient method, after which another step of parameter culling and re-scaling is performed according to the relationships provided in Equations 5 and 6 (step 12). The constrained conjugate gradient is minimized in step 14 by forcing the components of Λ that were set to zero to remain at zero during the calculation. Another rescaling is performed in step 16, and a comparison is made for goodness-of-fit (subroutine [get_gof.f90]) (step 18). If improvement in the log-likelihood function L is significant at the current level, the loop repeats, returning to step 4 of another iteration of the steps 4-18 loop. If the improvement in L is not significant at the prescribed significance level, or there is no increase in the number of parameters k, the program will back up to the previous solution, which is saved in memory during each iteration, and the estimation process is terminated (step 20). The estimated covariance matrix is converted to data that can be output to an appropriate display. As will be apparent to those of skill in the art, the above-identified subroutines interface with a number of other subroutines that are included in Computer Appendix A, but which are not specifically referenced or described in the written description. Further, although the bulk of the code provided is written in FORTRAN-90, it will be apparent to those of skill in the art that other programming languages and operating systems can be used. For example, files are provided within the Appendix to generate the object and binary code on UNIX machines.

The system and method of the present invention enable the rapid estimation of complex systems by building a minimum complexity model, allowing minimization of the number of parameters used to describe the system. The Algebron™ method enables the use of readily available personal computers to obtain the best possible algebraic model with no loss of key information with a minimum number of computational steps, thus providing accurate models in a period of time that is much shorter than computationally-intensive estimation methods of the prior art. The Algebron™ system and method are applicable to any number of complex systems, including financial, scientific or industrial applications, which can be modeled using algebraic methods.

It will be evident that there are additional embodiments and applications which are not specifically included in the detailed description, but which fall within the scope and spirit of the invention. The specification is not intended to be limiting, and the scope of the invention is to limited only by the appended claims.

We claim:

1. A computer-based method for prediction of behavior in a financial system using financial return data, the method comprising the steps of:

inputting the financial return data and a set of independent variables corresponding to properties of the financial system into a computer, wherein the financial return data comprises a plurality of data points having multiple co-variances which are collected over time;

generating a co-variance matrix comprising the steps of:
(a) defining a first loading matrix having elements comprising a first subset of independent variables within the set of independent variables, the first subset comprising a least quantity of independent variables estimated to fit the financial return data;
(b) determining a goodness-of-fit to the financial return data according to a selected goodness-of-fit criterion for each independent variable within the first loading matrix;
(c) culling each independent variable within the first loading matrix whose presence or elimination fails to change the goodness-of-fit to produce a reduced element first loading matrix;
(d) defining a next loading matrix containing a larger subset of independent variables than the first loading matrix;
(e) adding the next loading matrix to the reduced element first loading matrix to define a combination of loading matrix elements;
(f) determining the goodness-of-fit to the financial return data for the combination of loading matrix elements;
(g) culling each independent variable of the combination of loading matrix elements whose presence or elimination fails to change the goodness-of-fit; and
(h) repeating steps (d) through (g) until the goodness-of-fit to the financial return data meets the selected goodness-of-fit criterion in a final iteration, wherein the resulting co-variance matrix comprises the combination of loading matrix elements wherein the number of off-diagonal, non-zero loading matrix elements in the co-variance matrix is minimized and wherein the remaining independent variables comprise the smallest subset of independent variables that fits the financial return data.

2. The computer-based method of claim 1, wherein the financial return data comprises daily returns of financial securities.

3. The computer-based method of claim 2, wherein the daily returns comprise a linear combination of unknown factors and a part that fluctuates independently corresponding to noise, according to the relationship $$X_\alpha = \sum_{\beta=1}^{k} \Lambda_{\alpha,\beta} f_\beta + N_\alpha,$$

where α and β are financial securities, $X_\alpha$ is the daily return for financial security α, $f_\beta$ is an unknown factor, $\Lambda_{,\beta}$ is the loading matrix, and $N_\alpha$ is the noise.

4. The computer-based method of claim 1, wherein the goodness-of-fit is the logarithm of the likelihood function according to the relationship $$L = -2\ln\Pr(D|M) = \sum_n w_n(\ln\|V_n\| + x_n \cdot V_n^{-1} \cdot x_n),$$

where L is the log-likelihood function, V is the covariance matrix, Pr(D|M) is a goodness-of-fit quantity measuring the probability of data D given model M, and $w_n$ is an arbitrary weight.

5. The computer-based method of claim 1, wherein the least quantity of independent variables corresponds to zero unknown factors and a covariance matrix consisting of a diagonal.

6. A system for prediction of behavior in a financial system using financial return data, the system comprising:
a computer having an input for receiving the return data comprising a plurality of data points having multiple co-variances collected over a period of time and a set of independent variables corresponding to properties of the financial system;
computer software contained within the computer for performing a plurality of iterations, each iteration comprising identifying a loading matrix having elements comprising a subset of independent variables within the set of independent variables and determining a goodness of fit to the financial return data according to a selected goodness-of-fit criterion for each independent variable of the subset, eliminating each independent variable within the subset whose presence or elimination fails to change the goodness-of-fit at a predetermined minimum level, and combining, after the plurality of iterations, remaining independent variables to identify the smallest subset of independent variables that fits the financial return data to produce a co-variance matrix from a combination of loading matrices wherein the remaining independent variables correspond to loading matrix elements remaining after minimizing the number of off-diagonal, non-zero loading matrix elements;
wherein the plurality of iterations utilizes increasingly larger subsets of independent variables.

7. The system of claim 6, wherein the financial return data comprises daily returns of financial securities.

8. The system of claim 7, wherein the daily returns comprise a linear combination of unknown factors and a part that fluctuates independently corresponding to noise, according to the relationship $$X_\alpha = \sum_{\beta=1}^{k} \Lambda_{\alpha,\beta} f_\beta + N_\alpha,$$

where $\alpha$ and $\beta$ are financial securities, $X_\alpha$ is the daily return for financial security $\alpha$, $f_\beta$ is an unknown factor, $\Lambda_{\alpha,\beta}$ is the loading matrix, and $N_\alpha$ is the noise.

9. The system of claim 6, wherein the goodness-of-fit is the logarithm of the likelihood function according to the relationship $$L = -2\ln\Pr(D|M) = \sum_n w_n(\ln\|V_n\| + x_n \cdot V_n^{-1} \cdot x_n),$$

where L is the log-likelihood function, V is the covariance matrix, Pr(D|M) is a goodness-of-fit quantity measuring the probability of data D given model M and $w_n$ is an arbitrary weight.

10. The system of claim 6, wherein the least quantity of independent variables corresponds to zero unknown factors and a covariance matrix consisting of a diagonal.

11. A computer-based method for prediction of behavior in a financial system using financial return data, wherein the financial system has properties corresponding to a set of independent variables the method comprising:
inputting the financial return data and the set of independent variables into a computer, wherein the financial return data comprises a plurality of data points having multiple co-variances which are collected over time; and
using computer software contained within the computer, generating a multi-variable covariance matrix of the financial system comprising a plurality of variables and a plurality of factors using a subset of the plurality of factors, wherein the subset comprises a minimum number of factors that describe the plurality of variables and fit the financial return data, wherein the subset is selected by iteratively modeling each variable as a linear combination of unknown factors and a noise factor starting with zero factors and adding one factor with each iteration until a model is identified for which no further improvement occurs in the fit to the financial return data.

12. The computer-based method of claim 11, wherein improvement is determined by a goodness-of-fit criterion comprising a log-likelihood function which is minimized using a conjugate gradient.

13. The computer-based method of claim 11, wherein each iteration comprises the steps of:
defining a loading matrix containing a group of factors;
minimizing the number of off-diagonal, non-zero factors in the loading matrix, wherein the covariance matrix is generated by combining the loading matrices having a minimized number of off-diagonal, non-zero factors.

* * * * *

UNITED STATES PATENT AND TRADEMARK OFFICE
CERTIFICATE OF CORRECTION

PATENT NO. : 7,328,182 B1 Page 1 of 1
APPLICATION NO. : 09/404122
DATED : February 5, 2008
INVENTOR(S) : Amos Yahil and Richard Puetter It is certified that error appears in the above-identified patent and that said Letters Patent is hereby corrected as shown below:

Column 8, line 57, please change "$\Lambda_{,\beta}$" to --$\Lambda_{\alpha,\beta}$--; and Column 10, line 20, following "variables" please insert a --,--.

Signed and Sealed this

Twentieth Day of May, 2008

JON W. DUDAS
*Director of the United States Patent and Trademark Office*